US012743125B2

(12) United States Patent
Xiao et al.

(10) Patent No.: US 12,743,125 B2
(45) Date of Patent: Sep. 22, 2026

(54) NECK-MOUNTED WEARABLE COMPUTER AND A USING METHOD THEREOF

(71) Applicant: Xiaosong Xiao, Fuzhou (CN)

(72) Inventors: Han Xiao, Fuzhou (CN); Yuying Zuo, Fuzhou (CN); Houyi Chen, Fuzhou (CN); Kaiwei He, Fuzhou (CN)

( * ) Notice: Subject to any disclaimer, the term of this patent is extended or adjusted under 35 U.S.C. 154(b) by 295 days.

(21) Appl. No.: 18/434,817

(22) Filed: Feb. 7, 2024

(65) Prior Publication Data

US 2025/0181110 A1 Jun. 5, 2025

(30) Foreign Application Priority Data

Dec. 1, 2023 (CN) ........................ 202311634175.3

(51) Int. Cl.
*G06F 1/16* (2006.01)
*G06F 3/01* (2006.01)
*H04R 1/08* (2006.01)

(52) U.S. Cl.
CPC .............. *G06F 1/163* (2013.01); *G06F 3/014* (2013.01); *H04R 1/08* (2013.01)

(58) Field of Classification Search
CPC ........ G06F 1/163; G06F 3/014; G06F 1/1662; G06F 3/011; G06F 1/1683; G06F 1/1635; G06F 1/169; G06F 1/1698; G06F 3/167; H04R 1/08; H04R 1/1016; H04R 9/08; H04R 2460/13; G02C 3/006; G02C 11/10; G02C 2200/02; G02B 2027/0178; G02B 27/017
See application file for complete search history.

(56) References Cited

U.S. PATENT DOCUMENTS

2004/0036678 A1* 2/2004 Zngf ........................ G06F 3/014
345/168
2018/0365900 A1* 12/2018 Mendoza ................ G06F 3/016

* cited by examiner

*Primary Examiner* — Matthew A Eason
*Assistant Examiner* — Chayce R Bibbee

(57) ABSTRACT

The invention discloses a neck-mounted wearable computer and a using method thereof; the neck-mounted computer is firstly hung around neck, then neck-mounted smart glasses are mounted on ears and nose bridge from the head downwards, all the wearing completed; an automatic magnetic connection device automatically connects neck-mounted smart glasses and batteries between glasses and neck-mounted computer and/or the host's data transmission line for conduction, realizing human-computer interaction with neck-mounted wearable computer in standing, walking, sitting and lying posture. The invention realizes mobile fine-input keyboard and mouse and computing with PC computer technology productivity through palm keyboards, and is also equipped with finger-touch input of smartphone; combination of bone conduction microphone sensor and air conduction headsets realizes better voice human-computer interaction technology; utilization of split-type smart glasses display technology and neck-mounted structure reduces weight of glasses and avoids tugging interference of neck cable by separating battery host from smart glasses.

8 Claims, 9 Drawing Sheets

NECK-MOUNTED WEARABLE COMPUTER AND A USING METHOD THEREOF

1. TECHNICAL FIELD

The invention relates to the technical field of smart wearable device, and specifically relates to a neck-mounted wearable computer and a using method thereof.

2. BACKGROUND ART

In today's world, the two major computing platforms, namely PC computer, which has been in existence for more than 40 years featuring technology and productivity computing, and the smartphone, which has been in existence for 18 years featuring entertainment service, are now showing the ceiling of innovation and development, and the next-generation computing platform, which is even stronger than the two, is on the verge of emerging.

The next-generation computing platform recognized by the mainstream industry today is AR augmented reality technology. The technology is an image information technology that superimpose transparent and brighter than the superimposed things on the things in the realistic vision of the AR glasses to enhance the perception of the things. The disadvantage of this AR technology is that its scope of obtaining information belongs to a relatively special, niche scope of enhanced cognitive information, which is also the reason that it has been invented for 20 years so far and has only been able to face the business, namely to B, unable to face the customer, namely to C. The industry should develop, innovate and expand this technology into an image information technology that superimposes transparent and opaque, brighter or darker than the superimposed things, or alternately bright and dark, on the things in the realistic vision or any things outside the field of view that the wearer wants to know, on the things in the realistic vision of smart glasses to enhance cognition. This kind of information, which has broadened obtaining scope, is universal, mass-scope, capable of to C, cognitively-enhanced information. The vast majority of the information provided by the two computing platforms today is precisely the kind of cognitively-enhanced image information that the user wants, mostly out of his immediate field of vision, and back of which is not transparent to the user.

Today's two computing platforms already have a wide audience and a huge ecological resource of applications. However, PC computers can be used for scientific and technological productivity computing but not for mobile and entertainment services, smart phones can be used for entertainment services, but only for portable use, mobile use of which is not safe, along with disadvantages of small screen, poor battery life, no scientific and technological productivity computing, and it needs to take out a bag and lower head to hold, each of two platforms are not equipped with functions of the other. To become the next generation of computing platform, it must be more powerful than current two major computing platforms in all aspects, and must overcome their above shortcomings, therefore, it is necessary to overcome the key shortcomings of command input and output display technology of the mobile human-computer interaction, it needs to design and develop a mobile wearable computer device with excellent industrial design program according to the current situation of the basic materials and components, and also needs to join all the mature high and new technologies. At present, in order to promote the upgrading of computing platforms, priority should be given to solving the following practical technical problems:

1. The key technology of command input for mobile human-computer interaction: mobile and fine-input keyboard and mouse and computing with PC computer technology productivity, and is also equipped with finger-touch input of the smart phone and better voice human-computer interaction technology;
2. One of the key technologies for output display of mobile human-computer delivery: innovative smart glasses display technology that expands the scope of AR augmented reality information, which is an image information technology that superimposes transparent and opaque, brighter or darker than the superimposed things, or alternately bright and dark, on the things in the realistic vision or any things outside the field of view that the wearer wants to know, on the things in the realistic vision of smart glasses to enhance cognition. The prior art Chinese patent application CN111077679A is one of the answers, which needs to be further improved;
3. The second key technology for output display of mobile human-computer delivery: split smart glasses display technology, the split-type machine splits battery host and smart glasses to reduce the weight of the glasses, but the connection of data cable of battery and the host is troublesome, turning head and move when wearing glasses are subjected to pulling and tugging interference of the data cable. People are looking forward to a smart glasses both have advantages of no trailing wires, simple to put on and use, and can meet demand for long-lasting output display as split-type smart glasses; however, the industry has been plagued by technical problems for many years, which basically have no solution before the advent of the new wearable battery with high specific energy;
4. Combining the functions of two major computing platforms, i.e. PC computer and smart phone to generate their combining advantages and form a larger industrial design solution for next-generation computing platform;
5. Placing the PC computer and smart phone operating system, application software ecology and computing power into the cloud separately, and placing the human-computer interaction input control and display output into the mobile terminal;

The above technology can give birth to the mobile smart glasses cellphone cloud computer personal terminal EyePhonePC, its thin cell phone does not have to use low nm high-end chip, and has more powerful mobile cloud computing power than the PC computer and smart phone, but also without any modification to use a variety of desktop computers and various operating systems of smart phones and inherit a variety of operating systems to have huge ecological resources of traditional application software; it also has stronger ability than the two major computing platforms for upgrading;

6. The PC computers used at fixed points and portable cell phone that needs to be taken out from bag and lower head to watch with small screen and poor battery life, are combined and evolved into the technology attached in front of their mouths and ears, portable and mobile use anytime and anywhere, upgrading and breakthrough have been made in space-time range, plus the new technologies of mobile 5G, big data, cloud computing, AGI, and Lot, it will enable people to evolve into an iSmarter that drives all things;

7. The two-dimensional flat display of PC computers and smart phones will be comprehensively upgraded to a mobile three-dimensional display technology, what the user see and the superimposed augmented reality XR mixed reality information technology will be seamlessly connected and superimposed with the real three-dimensional world, which will enable people to enter the three-dimensional Internet era from the two-dimensional Internet.

Therefore, a neck-mounted wearable computer and a using method thereof has become an urgent problem for people to solve.

3. SUMMARY OF THE INVENTION

Aimed at problems in prior, the invention provides a neck-mounted wearable computer and a using method thereof.

In order to realize said purpose, the technical solution provided by the invention is as follows: a neck-mounted wearable computer and a using method thereof, comprising palm keyboards, a neck-mounted smart glasses, a neck-mounted computer and an automatic magnetic connection device;

Said palm keyboard consists of a left-handed keyboard and a right-handed keyboard, and both are held in the palm of the left hand and the right hand, respectively; the back of the keyboard is pressed against the palm via the connecting fixture; keys of said left-handed keyboard and the right-handed keyboard are arranged in rows and columns, the number of rows on each keyboard is not less than five rows, and the number of columns is not less than five columns; 26 English letters of said keys are arranged in three rows in accordance with QWERTY keyboard, arranged in the second, third and fourth rows of the five rows, and are consecutively arranged in sequence on the left-handed keyboard and the right-handed keyboard;

Said neck-mounted smart glasses are capable of superimposing in the transparent realistic vision of the binocular glasses at least a rectangular video image of same or different viewing angle of binoculars with same back transparent or opaque variable sizes and positions as the PC computers and smart phones, the transparency and opacity of which is modulated by electrochromic lenses layer provided outside the optics for displaying the superimposed image;

The host of said neck-mounted computer and neck battery with neck cable can be used integrally or separately;

Said automatic magnetic connection device communicatively and automatically attracts and connects the neck-mounted smart glasses and neck battery of the neck-mounted computer and/or the data transmission line of the host for conduction, the connection point of said magnetic connection device is set at the neck of the user.

Further, the row containing QWERTYUIOP in three rows of letters of said left-handed keyboard and right-handed keyboard keys is arranged in the palm of the user's hand in a position closer to the wrist, the user enables the fingertip portion of the finger to touch the keys to complete the operation of the mobile human-computer interaction command information input through finger stretching and bending, at the same time the command information will be output through wireless communication.

Further, said left-handed keyboard and right-handed keyboard both include a key panel with capacitive touch screen or resistive touch screen, a PCB electronic control board containing microprocessor, a keyboard battery, a keyboard casing, a connecting fixture that fixing the keyboard to the hand, a vibration motor that sends vibration signal feedback of key touch, and a buzzer that sends acoustic feedback signal of key touch; said connecting fixture is an elastic buckle or elastic band, said palm keyboard is also provided with a selection switch for choosing one from three, namely vibration or buzzer or vibration-free mute; said key panel, vibration motor, buzzer and selection switch are each communicatively coupled to the microprocessor of PCB electronic control board.

Further, said palm keyboard is also provided with function switching key, which switches the keyboard input function of the key panel to sliding board mouse function or writing pad function; when the key panel is switched to one of the sliding board mouse function or the writing pad function, each of said left-handed keyboard and the right-handed keyboard will open a different one of two functions at the same time for use at the same time; said palm keyboard is also provided with a mode display lamp, which is communicatively coupled to the microprocessor of the PCB electronic control board; said mode display lamp includes a handwriting mode lamp, a keyboard mode lamp, and a mouse mode lamp; said PCB electronic control board is provided with a wireless connection module unit capable of inputting human-computer interaction and control commands to the host of the neck-mounted computer.

Further, an eyeglass neck cable for connecting the two glasses legs are provided between two glasses legs of the neck-mounted smart glasses; an upper transmission line is hidden inside the eyeglass neck cable, and the upper transmission line is introduced into the eyeglass neck cable from one side of the glasses leg in a single bundle or in two bundles from both glasses legs, leads out of the middle section of the eyeglass neck cable to connect to the automatic magnetic connection device; said neck-mounted computer is connected to the automatic magnetic connection device via lower transmission line; said automatic magnetic connection device comprises an upper magnetic connector and a lower magnetic connector, said upper magnetic connector is connected to the eyeglasses neck cable through the upper transmission line, and the lower transmission line hidden in the neck cable extends to the scruff of neck of the user to connect to the lower magnetic connector; said lower magnetic connector is provided with a guiding block, which enables the lower magnetic connector to always face upwards, and at the same time enables the upper magnetic connector to be automatically attracted and guided by the lower magnetic connector until they are correctly aligned and attracted to each other to conduct between the upper transmission line and the lower transmission line hidden in the neck cable communicatively.

Further, said lower magnetic connector is provided with a fixing member to fix the lower magnetic connector to the collar or wearing apparel in a position at the scruff of user's neck, and said fixing member can be the elastic clip, buckle or magic tape.

Further, the battery outer surface of said neck-mounted computer is provided with a magnetic charging transmitting coil for wireless charging for the neck-mounted computer host or other devices and socket for charging or powering itself or/and other devices.

Further, said neck-mounted smart glasses is provided with a bone conduction microphone and piston air conduction headsets;

Said bone conduction microphone only picks up the whispering sound information emitted by exhaled airflow rubbing the respiratory tract when the user is in a state of no vibration of the laryngeal vocal cords; said bone conduction microphone is fixed in the nose pads of the smart glasses body, and the legs of smart glasses body are equipped with a microprocessor electronic control unit with video image display drive, and said bone conduction microphone collects amplitude-modulation audio electric signals generated by the sound vibration of nasal bones, which is then communicatively coupled to the microprocessor electronic control unit on the electronic control board;

Said air-conduction headsets are set at the position near the user's ear and behind two legs of the glasses body, suspended in an in-ear position facing the vortex of the user's ear, said air conduction headsets are provided with a microphone touch-sensitive two-option conversion switch, and the shank of said air conduction headsets are movably connected to the smart eyeglasses body.

A method of using a neck-mounted wearable computer,

Step 1 wearing method:

Hanging the neck-mounted computer around the neck first, and then erecting the neck-mounted smart glasses on the ears and the nose bridge from the head down to complete all the wearing; said automatic magnetic connection device automatically attracts and connects the smart glasses and battery between neck-mounted smart glasses and the neck-mounted computer and/or the data transmission line of the neck-mounted computer host for conduction;

Step 2 operation method:

The palm keyboard and the neck-mounted smart glasses are used in combination to realize that the user implements human-computer interaction with the neck-mounted computer in the posture of standing, walking, sitting and lying, and the specific operation methods are as follows:

When carrying out human-computer interaction in walking, the finger touches the palm keyboard keys to type, or the finger touches the function switching key to switch to the mouse interface to manipulate the sliding board mouse, or switch to the writing pad interface to write character command information in a touch-type writing manner to input to the neck-mounted computer host;

It should be noted that the keyboards of the present invention are held in the palm to manipulate and can not see the keys and considering walking safety, touch typing must be used to manipulate. The reason for selecting key layout of QWERTY keyboard lies in that this keyboard is the most widely-used keyboard in the world and people familiar with its manipulation of fingerprints and can touch type are also numerous, so the time for them to be familiar with or learn the keyboard touch-type time is greatly reduced; when practice manipulation for the first time, the user can look at the screen with the virtual keyboard while typing;

Before the user uses traditional QWERTY keyboard for touch typing or uses the writing pad for touch writing, the user also needs to use the sliding board mouse accordingly narrow the display screen in neck-mounted smart glasses and drag it to the bottom of the glasses visual field according to the walking speed, so as to ensure the safety of the operation;

When in the noise environment or private calls or voice instructions is needed, gently press the piston air conduction headsets into the ear to isolate the external noise, and at the same time gently touch the two-option conversion switch on the headsets to close the air conduction headsets and switch to the bone conduction microphone, human-machine interaction input into the computer host is achieved through bone conduction language command information by whisper made from exhaled airflow rubbing the respiratory tract when the user is in a state of no vibration of the laryngeal vocal cords.

Said neck-mounted computer host receives the input command information and then uploads the audio and video information of the calculation result into the neck-mounted smart glasses, outputs the video and audio display of human-computer interaction for the user, and completes the human-computer interaction;

Said neck-mounted smart glasses provide the user with human-computer interaction outputs of various audio and video display methods, including providing VR virtual reality display and widescreen movie display of superimposed virtual video image and the entire visual field of the glasses around it with opaque back, at which time the entire visual field of the glasses is covered by an opaque electrochromic lens layer; it also provides with AR augmented reality display of superimposing virtual video image brighter than the superimposed object in the transparent realistic field of glasses to enhance cognitive information, at which time the entire visual field of glasses is covered by a fully transparent electrochromic lenses layer; it includes provides with superimposed images that is brighter, darker, or alternately bright and dark than the superimposed object, in or out of the visual field of the glasses, shot of real things, or that the glasses wearer would like to know on the realistic field of the transparent realistic field of eyeglasses, such as display of any audio and video information of a rectangular screen of existing PC computer and smart phone that is opaque on the back, at which time the rectangular screen portion superimposed in the transparent realistic field of the eyeglasses is covered by a modulated opaque electrochromic lenses layer; it includes providing with various video displays of outdoor giant screen, indoor wall-mounted TV, laptop computers, tablet computers, or the audio and video display of lower horizontal bar of information needed for running, biking and driving by changing the size of the PC computer screen display in the realistic field of the eyeglasses; when said neck-mounted smart glasses superimpose rectangular video image of same or different viewing angles of the binoculars in the realistic field of the binocular glasses, said video image is an image displayed in 2D or 3D;

Step 3 a method of collectively using today's smartphone with multiple operating systems and PC computer with multiple operating systems through mobile cloud computer terminals:

The host of said neck-mounted computer is selected from any smartphone with closed or open operating system in prior art (e.g., closed ios, or open Android, or open Harmony operating system), and a smartphone may be collectively select, download and install the rest of a plurality of cloud cell phone APPs with different operating systems and a plurality of cloud computer APPs with different operating systems, (For example, only one Samsung Android cell phone can download and install cloud cellphone APPs with Apple ios, Ali YunOS and Xiaomi Android, etc. operating systems; and download and install the cloud computer APPs of Microsoft Windows Azure, HuaweiCloudPC of Huawei, Apple's iCloud, and ctyun of China Telecom); and the user can use all the world's application software ecological resources directly on the cloud at any time.

When collectively using the mobile cloud computer terminal, said smartphone sends finger touch palm keyboard key input information, touch sliding board mouse input information, writing pad writing input information, ordinary voice or whispered voice input information to cloud computer through 5G or wireless communication with higher peak transmission rate to compute and wirelessly receive video image information of the computation results, and casts it to the screen of the neck-mounted smart glasses to output display.

Compared with the prior art, the invention has following advantages: the invention realizes mobile and fine-input keyboard and mouse and computing with PC computer technology productivity through the palm keyboard, and is also equipped with finger-touch input of the smart phone; the combination of the bone conduction microphone and air conduction headsets and used with smart glasses integrally realizes better voice human-computer interaction technology of daily common language plus whispering; at the same time, it avoids disadvantages of poor duration time and frequently taking down for charging of traditional wireless earphones and microphones; the utilization of multi-function display function of split-type smart glasses and neck-mounted structure reduces the weight of glasses and avoids the tugging and pulling interference of long connecting lines of glasses legs.

Relying on the mobile human-computer interaction of palm keyboard input to neck-mounted computer host and smart glasses display output multiple functions, and support of cloud computing method, compared with the PC computers and smart phones in prior art, the invention of the neck-mounted wearable computer, is a new terminal of the mobile cloud computer covering the world's two major computing platforms of PC computers and smart phones and all their applications ecology.

4. BRIEF DESCRIPTION OF ACCOMPANY DRAWINGS

Figure 1:
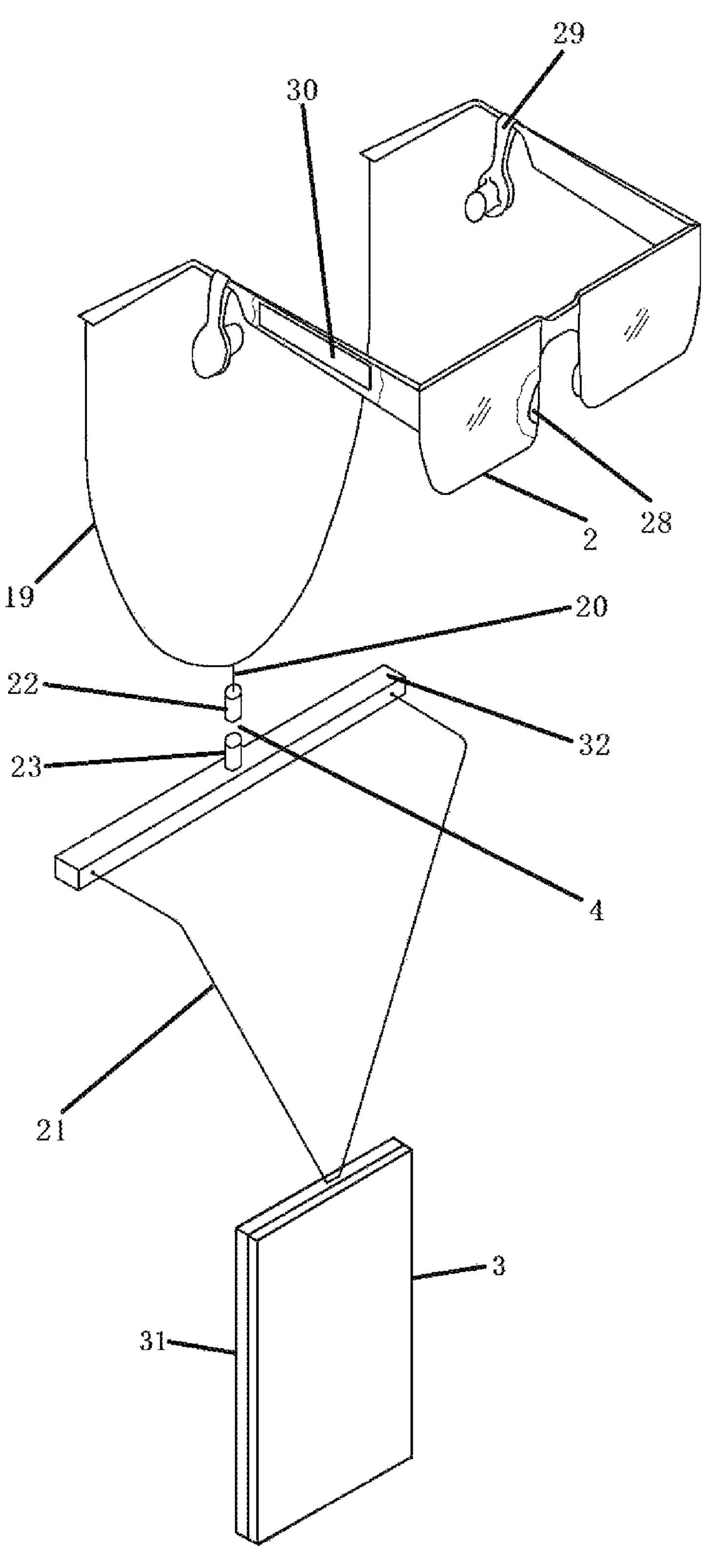
FIG. 1 is the structural diagram of the neck-mounted wearable computer provided by the invention.
Figure 2:
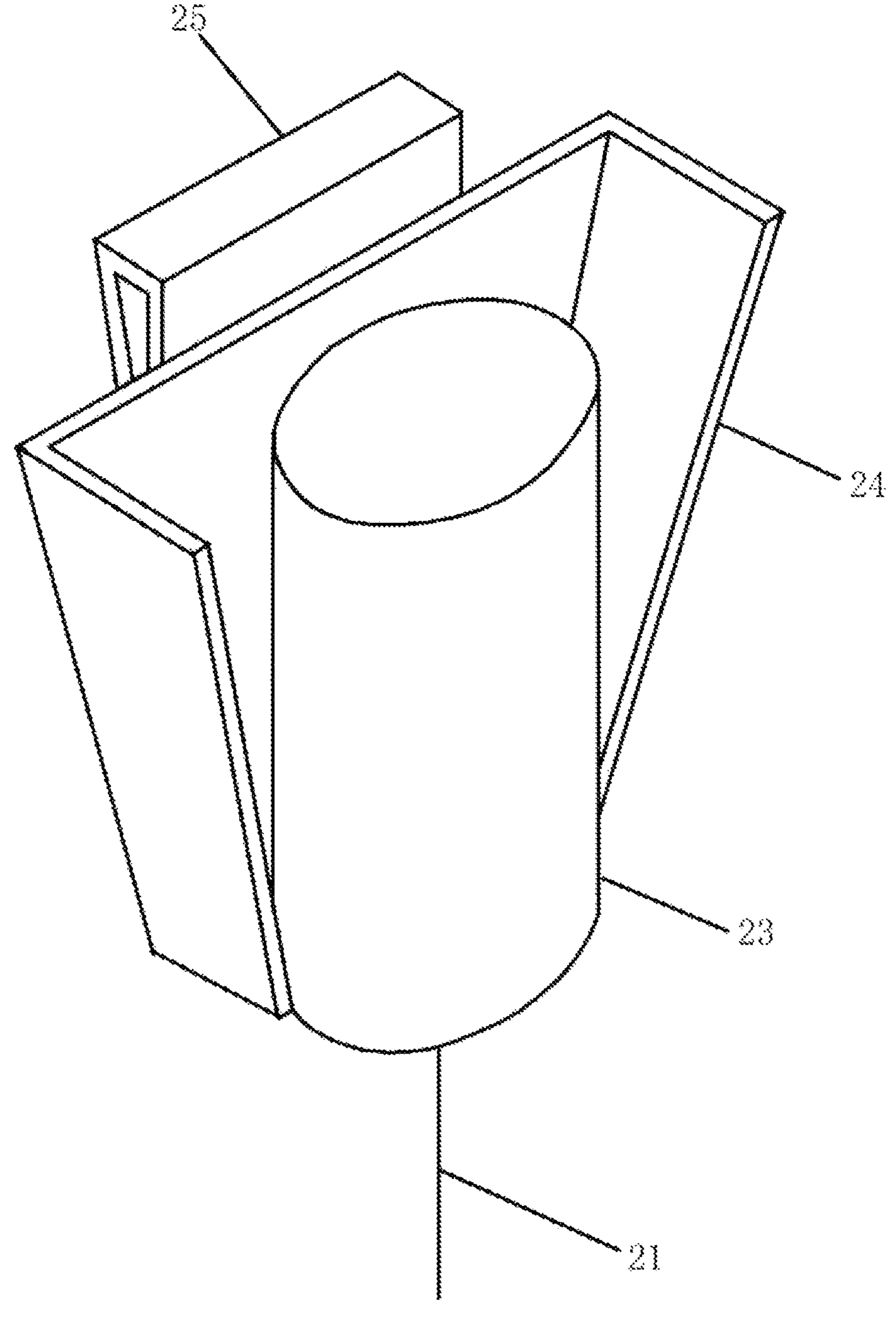
FIG. 2 is the structural diagram of the guiding block and fixing member.
Figure 3:
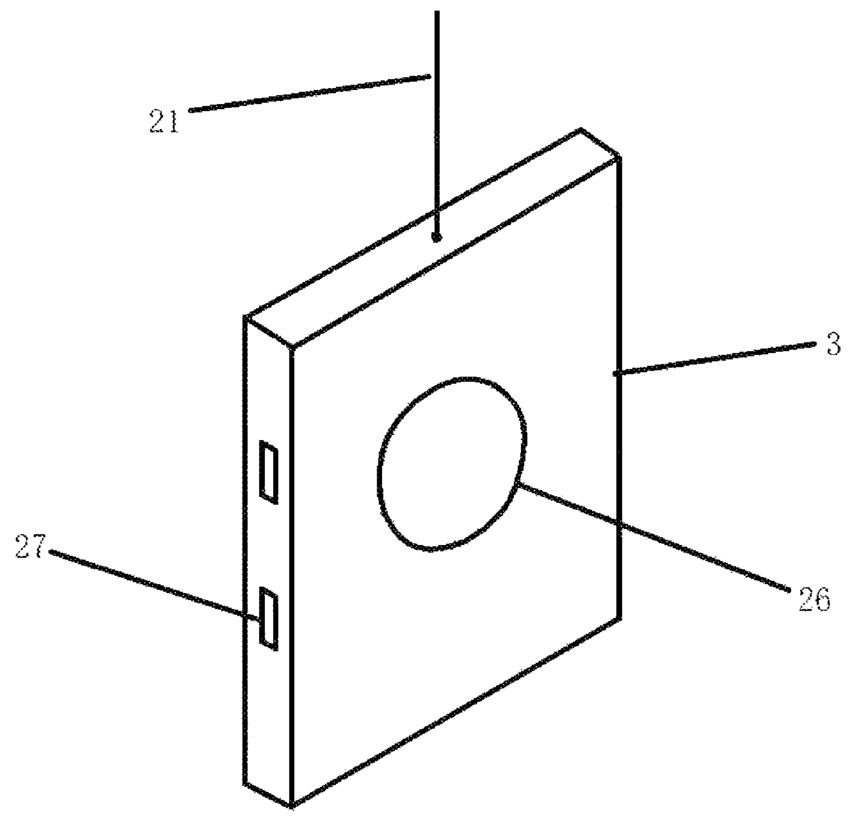
FIG. 3 is the structural diagram of the neck battery.
Figure 4:
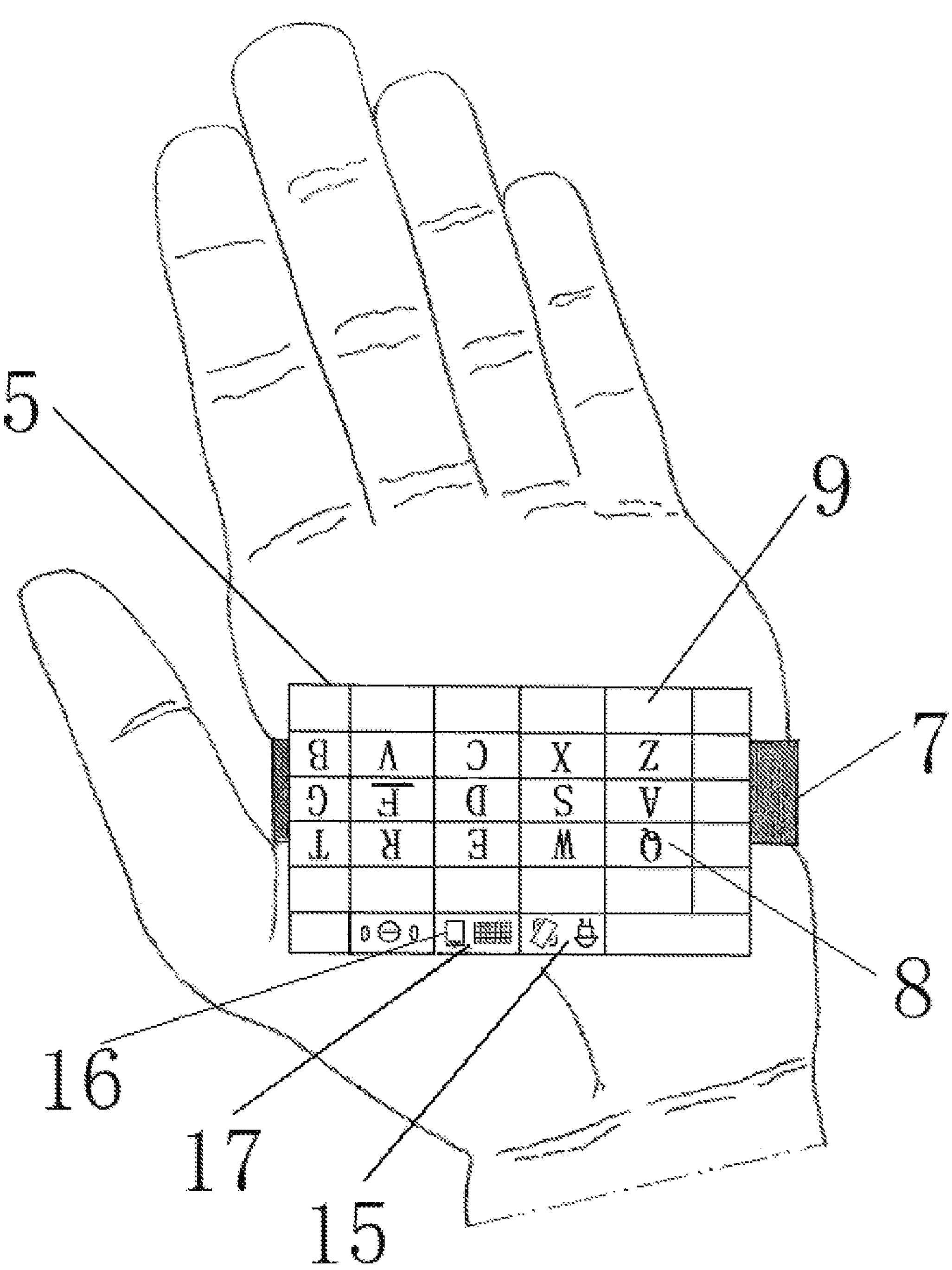
FIG. 4 is the structural diagram of the left-handed keyboard.
Figure 5:
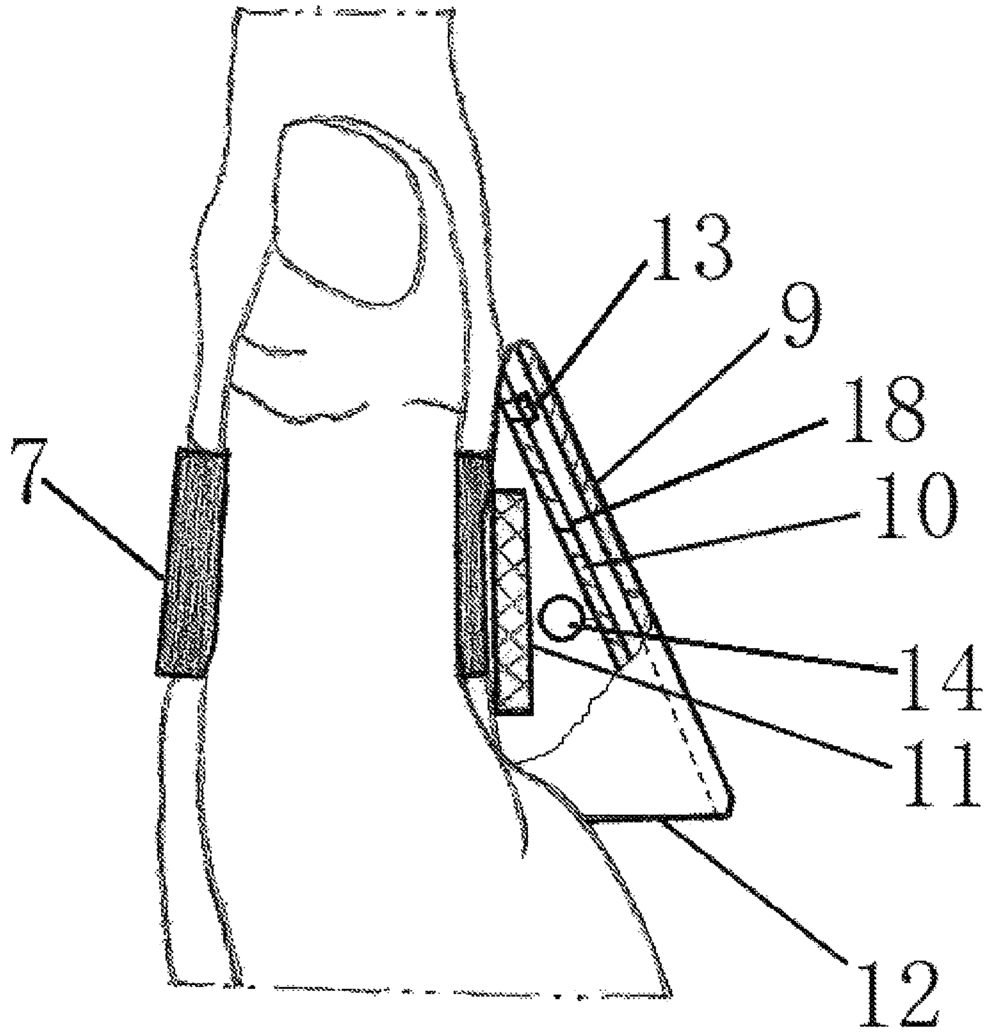
FIG. 5 is the sectional structural diagram of the palm keyboard.
Figure 6:
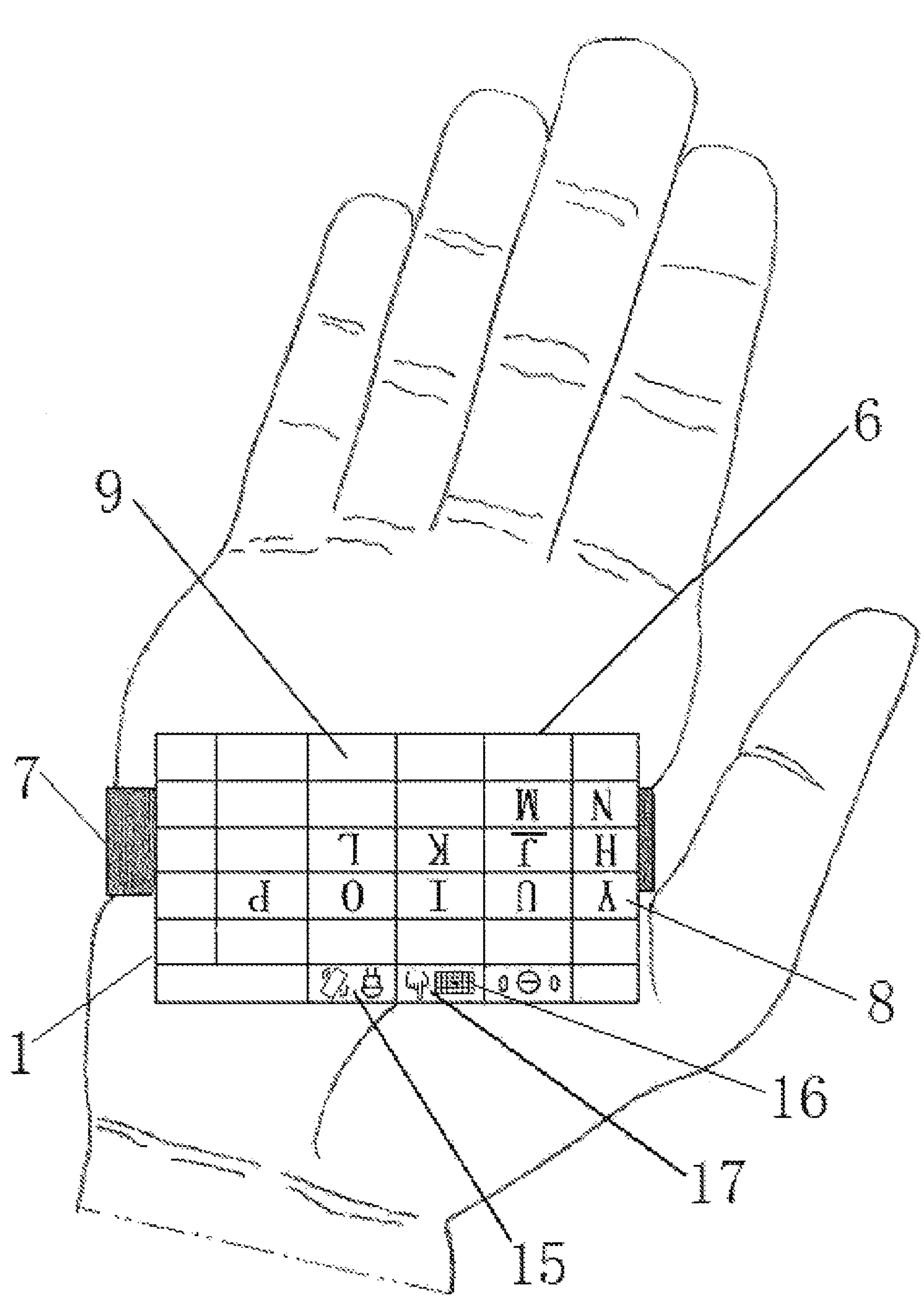
FIG. 6 is the structural diagram of the right-handed keyboard.
Figure 7:
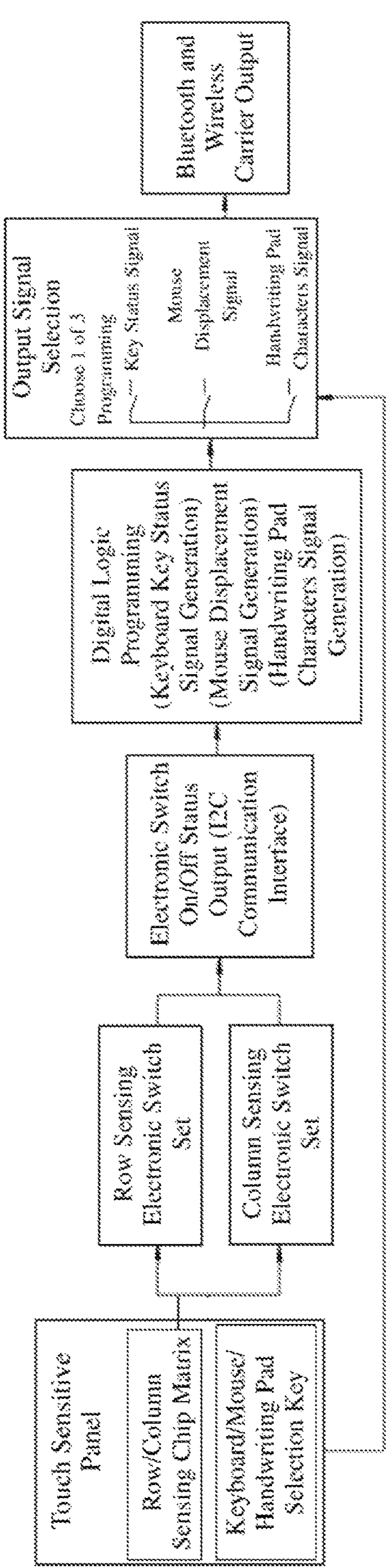
FIG. 7 is the diagram illustrating the working principle of the keyboard/mouse/writing pad.
Figure 8:
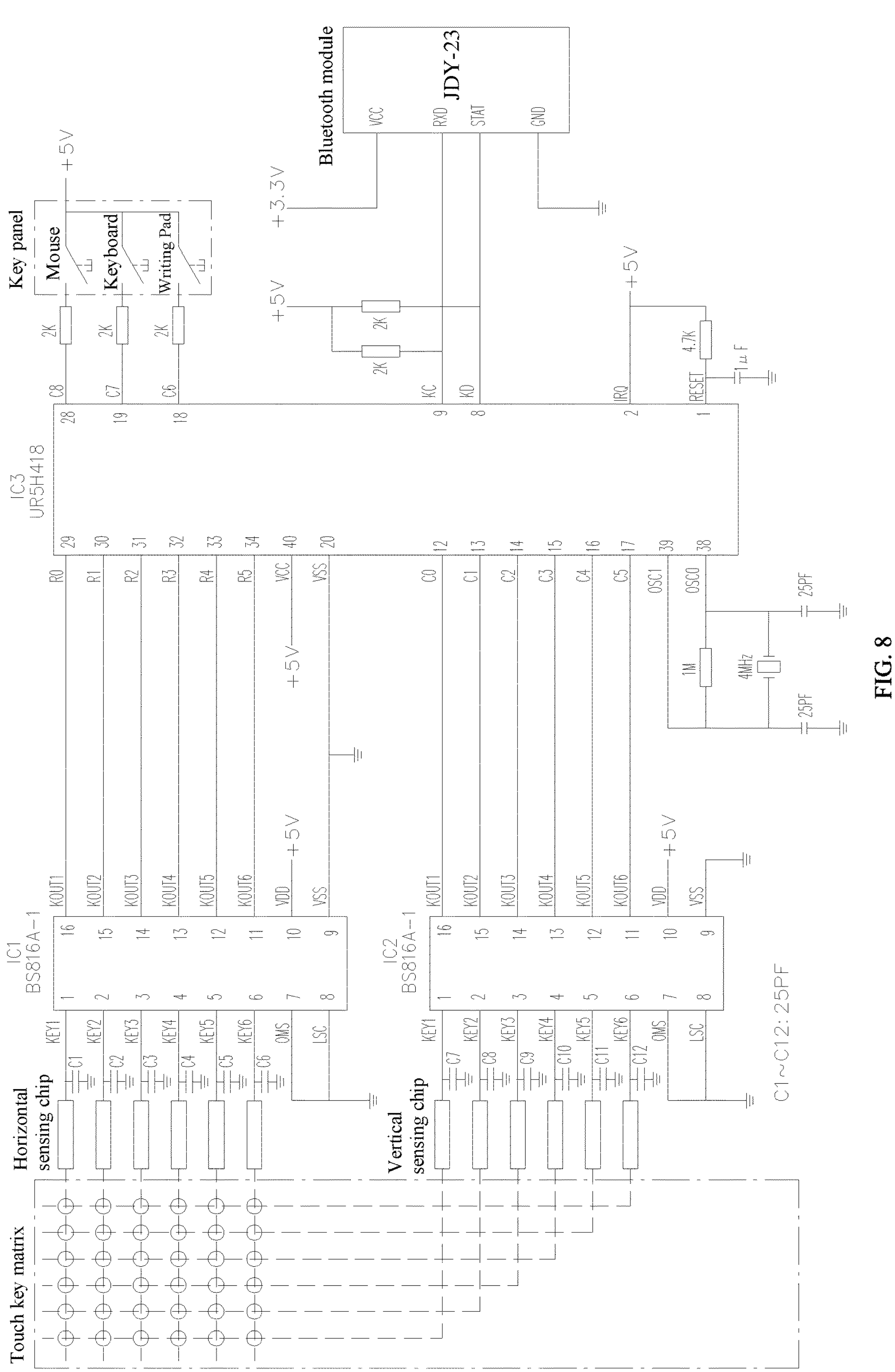
FIG. 8 is the circuit diagram of the keyboard/mouse/writing pad, wherein the graph in the dot frame represents that the junction of the horizontal sensing chip and vertical sensing chip forms a touch key, and each key controls a horizontal line input and a vertical column input at the same time.

In the drawings: 1. palm keyboard, 2. neck-mounted smart glasses, 3. neck-mounted computer, 4. automatic magnetic connection device, 5. left-handed keyboard, 6. right-handed keyboard, 7. connecting fixture, 8. key, 9. key panel, 10. PCB electronic control board, 11. keyboard battery, 12. key case, 13. vibration motor, 14. buzzer, 15. selection switch, 16. function switching key, 17. mode display lamp, 18. wireless connection module unit, 19. eyeglass neck cable, 20. upper transmission line, 21. lower transmission line, 22. upper magnetic connector, 23. lower magnetic connector, 24. guiding block, 25. fixing member, 26. magnetic charging transmitting coil, 27. socket, 28. bone conduction microphone, 29. piston air conduction headsets, 30. electronic control unit, 31. neck battery, 32. neck-mounted holder.

5. SPECIFIC EMBODIMENT OF THE INVENTION

The invention is further described in detail hereinafter with reference to the drawings.

With reference to FIGS. 1 to 9, the invention is described in detail.

A neck-mounted wearable computer, comprising palm keyboards 1, a neck-mounted smart glasses 2, a neck-mounted computer 3 and an automatic magnetic connection device 4; said palm keyboard 1 consists of a left-handed keyboard 5 and a right-handed keyboard 6, and both are held in the palm of the left hand and the right hand, respectively; the back of the keyboard is pressed against the palm via the connecting fixture 7; keys 8 of said left-handed keyboard 5 and the right-handed keyboard 6 are arranged in rows and columns, the number of rows on each keyboard is not less than five rows, and the number of columns is not less than five columns; 26 English letters of said keys 8 are arranged in three rows in accordance with QWERTY keyboard, arranged in the second, third and fourth rows of the five rows, and are consecutively arranged in sequence on the left-handed keyboard 5 and the right-handed keyboard 6 so that the user can directly inherit or quickly learn the touch-typing of traditional keyboard and can guarantee safety walking while using;

Said neck-mounted smart glasses are capable of superimposing in the transparent realistic vision of the binocular glasses at least a rectangular video image of same or different viewing angle of binoculars with same back transparent or opaque variable sizes and positions as the PC computers and smart phones, the transparency and opacity of which is modulated by electrochromic lenses layer provided outside the optics for displaying the superimposed image;

The host of said neck-mounted computer 3 and neck battery 31 with neck cable can be used integrally or separately; said automatic magnetic connection device 4 communicatively and automatically attracts and connects the neck-mounted smart glasses 2 and neck battery 31 of the neck-mounted computer 3 and/or the data transmission line of the host for conduction, the connection point of said magnetic connection device 4 is set at the neck of the user; the neck-mounted computer 3 can be decorated with a necklace, scarf, neckerchief, vest, shoulder straps for suit pants, tie or other clothing accessories integrally, so that the whole neck-mounted computer 3 is hidden within the wearable clothing accessory, and the lower end of the said clothing accessory is also attached with a magnetic sheet or card plate to be connected with the magnetic sheet or card buckle on the belt or waistband of the user to be positioned, so as to prevent the neck-mounted computer 3 from swaying from side to side when it is being used on walking.

In one embodiment of this application, Samsung S20 smartphone with dp projection function is selected as the neck-mounted computer host 3, which is attached to the magnetic charging transmitting coil 26 of the said neck battery 31 for charging and using at the same time; a model of XREAL AIR 2 Pro from Nreal (Beijing) Technology Co., Ltd. is selected with the electron dimming layer for adjusting transparency out of lenses, and the dimming layer can conduct multi-grade dimming through the touch switches on the glasses legs, and can superimpose dp connected and projected PC computer and smart phone rectangular video image in the transparent realistic field of binoculars for the finished smart glasses 2 to output display; mobile human-computer interaction is completed with the cooperation of said palm keyboard 1 for inputting control commands.

The legs of selected finished smart glasses 2 are originally provided with a speaker component and a microphone component to be communicatively connected with the microprocessor electronic control unit 30 respectively. The embodiment also selects an ordinary wired piston headsets 29 with a two-option touch switch added on the face, integrally mounted and connected to the legs of the glasses body, and also selects a BM-06 model bone conduction microphone 28 produced by Ningbo Shuozheng Electronic Technology Co., Ltd. with diameter of 8 mm and height of 3.5 mm to be modified and hidden inside the nose pads of said glasses; wherein the headset portion of the piston headsets 29 is directly and simply modified to replace the speaker part on the legs of selected finished smart glasses 2 and is communicatively connected with the microprocessor electronic control unit 30; wherein the microphone part of the piston headsets 29 and the bone conduction microphone 28 of model BM-06 are connected with said two-option touch switch to choose one of them, replacing the original microphone part on the legs of the finished smart glasses 2, and is communicatively connected with the microprocessor electronic control unit 30, so as to complete selective input human-computer interaction between normal voice whispering instructions and whispering voice instructions. (See FIG. 1 for structural diagram of the neck-mounted wearable computer of the invention, and FIG. 9 for schematic diagram for electronic control of the embodiment.)

Figure 9:
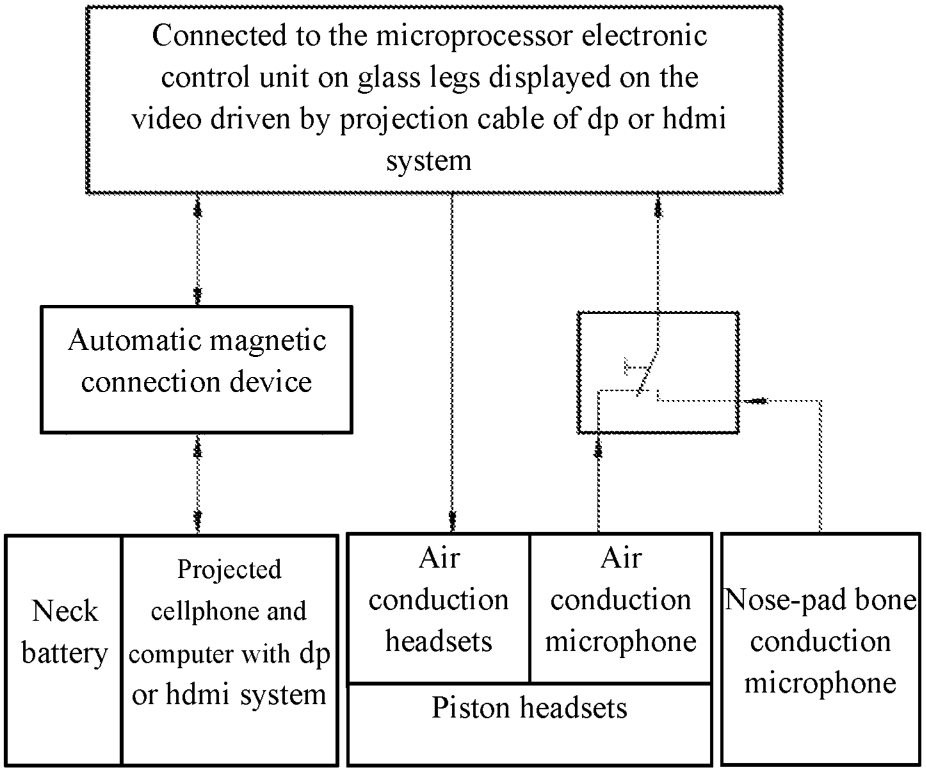
FIG. 9 is the schematic diagram for electronic control of the embodiment.

This embodiment further selects the male connector of the commercially available dp-system magnetic adapter from Yishi Technology as the lower magnetic connector 7, which is connected to the host 3 of S20 smartphone through the lower transmission line 21, and the female connector of the magnetic adapter as the upper magnetic connector 22 is connected to the XREAL AIR 2 Pro smart glasses 2 through the upper transmission line 20 to form an automatic magnetic connection device 4 for the split-type smart glasses 2 (refer to the schematic diagram for electronic control of the embodiment of FIG. 9).

In one embodiment of the application, the row containing QWERTYUIOP in three rows of letters of said left-handed keyboard 5 and right-handed keyboard 6 keys is arranged in the palm of the user's hand in a position closer to the wrist, the user enables the fingertip portion of the finger to touch the keys 8 to complete the operation of the mobile human-computer interaction command information input through finger stretching and bending, at the same time the command information will be output through wireless communication.

In one embodiment of the application, said left-handed keyboard 5 and right-handed keyboard 6 both include a key panel 9 with capacitive touch screen or resistive touch screen, a PCB electronic control board 10 containing microprocessor, a keyboard battery 11, a keyboard casing 12, a connecting fixture 7 that fixing the keyboard to the hand, a vibration motor 13 that sends vibration signal feedback of key 8 touch, and a buzzer 14 that sends acoustic feedback signal of key 8 touch; said connecting fixture 7 is an elastic buckle or elastic band, said palm keyboard 1 is also provided with a selection switch 15 for choosing one from three, namely vibration or buzzer or vibration-free mute; said key panel 9, vibration motor 13, buzzer 14 and selection switch 15 are each communicatively coupled to the microprocessor of PCB electronic control board 10.

In one embodiment of the application, said palm keyboard 1 is also provided with function switching key 16, which switches the keyboard input function of the key panel 9 to sliding board mouse function or writing pad function; when the key panel 9 is switched to one of the sliding board mouse function or the writing pad function, each of said left-handed keyboard 5 and the right-handed keyboard 6 will open a different one of two functions at the same time for use at the same time; for example, when the mouse function of the right-handed keyboard 6 is turned on, the left-handed keyboard 5 will turn on writing pad function, and when the right hand manipulates the mouse so that the mouse cursor on the screen of the neck-mounted smart glasses 2 is positioned, then the user can write and input the manipulation command information on the writing pad of the left-handed keyboard 5 with the index finger of right hand; said palm keyboard 1 is also provided with a mode display lamp 17, which is communicatively coupled to the microprocessor of the PCB electronic control board 10; said mode display lamp 17 includes a handwriting mode lamp, a keyboard mode lamp, and a mouse mode lamp; said PCB electronic control board 10 is provided with a wireless connection module unit 18 capable of inputting human-computer interaction and control commands to the host of the neck-mounted computer 3.

In one embodiment of the application, an eyeglass neck cable 19 for connecting the two glasses legs are provided between two glasses legs of the neck-mounted smart glasses 2; an upper transmission line 20 is hidden inside the eyeglass neck cable 19, and the upper transmission line 20 is introduced into the eyeglass neck cable 19 from one side of the glasses leg in a single bundle or in two bundles from both glasses legs (introduced in two bundles make the whole neck cable thinner and softer), leads out of the middle section of the eyeglass neck cable 19 to connect to the automatic magnetic connection device 4; said neck-mounted computer 3 is connected to the automatic magnetic connection device 4 via lower transmission line 21; said automatic magnetic connection device 4 comprises an upper magnetic connector 22 and a lower magnetic connector 23, said upper magnetic connector 22 is connected to the eyeglasses neck cable 19 through the upper transmission line 20, and the lower transmission line 21 extends to the scruff of neck of the user to connect to the lower magnetic connector 23; said lower magnetic connector 23 is provided with a guiding block 24, which enables the lower magnetic connector 23 to always face upwards, and at the same time enables the upper magnetic connector 22 to be automatically attracted and guided by the lower magnetic connector 23 until they are correctly aligned and attracted to each other to conduct between the upper transmission line 20 and the lower transmission line 21.

In one embodiment of the application, said lower magnetic connector 23 is provided with a fixing member 25 to fix the lower magnetic connector 23 to the collar or wearing apparel in a position at the scruff of user's neck, and said fixing member 25 can be the elastic clip, buckle or magic tape.

In one embodiment of the application, the neck-mounted computer 3 is provided with a hollow neck-mounted holder 32 at the upper end of the neck battery 31 to facilitate wearing, and the battery division in parallel connection with partial neck battery 31 is provided in the hollow holder to balance the weight of the upper and lower ends; the neck battery 31 outer surface is provided with a magnetic charging transmitting coil 26 for wireless charging for the neck-mounted computer host or other devices and socket 27 for charging or powering itself or/and other devices.

In one embodiment of the application, said neck-mounted smart glasses 2 is provided with a bone conduction microphone 28 and piston air conduction headsets 29; said bone conduction microphone 28 only picks up the whispering sound information emitted by exhaled airflow rubbing the respiratory tract when the user is in a state of no vibration of the laryngeal vocal cords; said bone conduction microphone 28 is fixed in the nose pads of the smart glasses body, and the legs of smart glasses body are equipped with a microprocessor electronic control unit 28 with display drive, and said bone conduction microphone 28 collects amplitude-modulation audio electric signals generated by the sound vibration of nasal bones, which is then communicatively coupled to the microprocessor electronic control unit 30 on the electronic control board; said air conduction headsets 29 are set at the position near the user's ear and behind two legs of the glasses body, suspended in an in-ear position facing the vortex of the user's ear, said air conduction headsets 29 are provided with a microphone touch-sensitive two-option conversion switch, and the shank of said air conduction headsets 29 are movably connected to the smart eyeglasses body.

A specific implementing process for a using method of a neck-mounted wearable computer is as follow:

Step 1 wearing method:

Hanging the neck-mounted computer around the neck first, and then erecting the neck-mounted smart glasses 2 on the ears and the nose bridge from the head down to complete all the wearing; said automatic magnetic connection device 4 automatically attracts and connects the smart glasses and battery 31 between neck-mounted smart glasses and the neck-mounted computer 3 and/or the data transmission line of the neck-mounted computer host for conduction;

Step 2 operation method:

The palm keyboard 1 and the neck-mounted smart glasses 2 are used in combination to realize that the user implements human-computer interaction with the neck-mounted computer in the posture of standing, walking, sitting and lying, and the specific operation methods are as follows:

When carrying out human-computer interaction in walking, the finger touches the palm keyboard keys 8 to type, or the finger touches the function switching key 16 to switch to the mouse interface to manipulate the sliding board mouse, or switch to the writing pad interface to write character command information in a touch-type writing manner to input to the neck-mounted computer host;

Before the user uses traditional QWERTY keyboard for touch typing or uses the writing pad for touch writing, the user also needs to use the sliding board mouse accordingly narrow the display screen in neck-mounted smart glasses and drag it to the bottom of the glasses visual field according to the walking speed, so as to ensure the safety of the operation;

When in the noise environment or private calls or voice instructions is needed, gently press the piston air conduction headsets 29 into the ear to isolate the external noise, and at the same time gently touch the two-option conversion switch on the headsets to close the air conduction headsets 29 and switch to the bone conduction microphone 28, human-machine interaction input into the neck-mounted computer host is achieved through bone conduction language command information by whisper made from exhaled airflow rubbing the respiratory tract when the user is in a state of no vibration of the laryngeal vocal cords.

When human-computer interaction is carried out without keyboard typing input in standing, walking, sitting or lying down, a simpler method can be used to realize human-computer interaction input by selecting the screen touch mouse of the smartphone computer host or by direct control of ring mouse in prior art;

Said neck-mounted computer host receives the input command information and then uploads the audio and video information of the calculation result into the neck-mounted smart glasses 2, outputs the video and audio display of human-computer interaction for the user, and completes the human-computer interaction;

Said neck-mounted smart glasses 2 provide the user with human-computer interaction outputs of various audio and video display methods, including providing VR virtual reality display and widescreen movie display of superimposed virtual video image and the entire visual field of the glasses around it with opaque back, at which time the entire visual field of the glasses is covered by an opaque electrochromic lens layer; it also provides with AR augmented reality display of superimposing virtual video image brighter than the superimposed object in the transparent realistic field of glasses to enhance cognitive information, at which time the entire visual field of glasses is covered by a fully transparent electrochromic lenses layer; it includes providing with superimposed images that is brighter, darker, or alternately bright and dark than the superimposed object, in or out of the visual field of the glasses, shot of real things, or that the glasses wearer would like to know containing most information, most needed by public and most common on the realistic field of the transparent realistic field of eyeglasses, such as display of any audio and video information of a rectangular screen of existing PC computer and smart phone that is opaque on the back, at which time the rectangular screen portion superimposed in the transparent realistic field of the eyeglasses is covered by a modulated opaque electrochromic lenses layer; it provides with various video displays of outdoor giant screen, indoor wall-mounted TV, laptop computers, tablet computers, or the audio and video display of lower horizontal bar of information needed for running, biking and driving by changing the size of the PC computer screen display in the realistic field of the eyeglasses; when said neck-mounted smart glasses superimpose rectangular video image of same or different viewing angles of the binoculars in the realistic field of the binocular glasses, said video image is an image displayed in 2D or 3D;

Step 3, a method of collectively using today's smartphone with multiple operating systems and PC computer with multiple operating systems through mobile cloud computer terminals:

The host of said neck-mounted computer 3 is selected from any smartphone with closed or open operating system in prior art (e.g., install one of smartphones with ios, or Android, or Harmony operating system), and a smartphone may collectively install a plurality of cloud cell phone APPs with different operating systems and a plurality of cloud computer APPs with different operating systems, (For example, install current Alibaba Cloud cell phone APPs and HuaweiCloud cell phone APPs etc., then install Alibaba Cloud computer APPs, HuaweiCloud computer APPs and Microsoft Azure computer APPs, etc.), which can make one phone equipped with functions of current various type of smart phones and computers, and can cloud download and use their respectively owned ecological resources. (For example, if you choose Apple's iPhone 15 with closed ios operating system as the host, and optionally download Huawei Kunpeng cloud cell phone APPs with open Harmony operating system, and then optionally download Apple Mac OS iCloud PC computer APPs and WUYING Workspace with Alibaba Cloud Linux operating system, etc., you can use various applications on their clouds at any time, and you can have all the IT ecological resources in the world with only one smartphone).

When using the neck-mounted wearable computer with smartphone as the host, said smartphone just needs to sends finger touch palm keyboard key 8 information, touch sliding board mouse information, writing pad writing information, ordinary voice or whispered voice information to cloud computer through 5G or wireless communication with higher peak transmission rate with low latency to compute and wirelessly receive video image information of the computation results, and casts it to the screen of the neck-mounted smart glasses 2 to output display. Relying on powerful cloud computing can make all the commonly used PC computers and smart phones to integrate their functions, and compatibly inherit their operating system without any modification and all the huge amount of application software, so that the neck-mounted wearable computer will become a new type of wearable mobile terminal cloud computer, and become a new generation of new mobile space computing platform larger than existing PC computers and smart phones.

As the neck-mounted wearable computer adopts the powerful cloud computing to make a large number of computing in the Internet Data Center, thus the smartphone adopted by the neck-mounted wearable computer can be equipped with a thin cell phone with high nano-process and low-end chip, avoiding the use of low nano-process and high-end chip so as to lower cost.

The neck-mounted smart glasses 2 of the neck-mounted wearable computer can be used to display audio and video images from different viewing angles independently by both eyes, so that the walker can see the superimposed three-dimensional video image information in the visual field of glasses, therefore, the new field of using wearable computers when walking and three-dimensional display are introduced at the same time to two largest computing platforms of today, i.e., the PC computer that uses two-dimensional display in a fixed location for more than 40 years and the smartphone that portably uses two-dimensional display for more than 10 years, and a technological breakthrough has been achieved in the mobile use and three-dimensional display of two largest computing platforms at present.

The use of PC cloud computer of neck-mounted wearable computer, can make scientific and technological productivity computing into a broader outdoor mobile field, which can easily compute all kinds of artificial intelligence big-bit application plug-ins supported by big data at any time and anywhere; the cloud cellphone using method of computer host cellphone enables the smartphone entertainment and services from the portable bag into mobile wearable, and there is no need to lower head and hold it with hand from now on, with large screen display and long battery life; this device has integrated two large computing platforms of PC computers and smart phones into one, at the same time connecting the Lot Internet of things for people to drive, plus AGI general artificial intelligence, so that they are attached to people's eyes, ears and mouth, ready to be used at any time and any place, which enables people to become smart internet user and realizes sci-fi dream of iSmartor.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

What is claimed is:

1. A neck-mounted wearable computer comprising palm keyboards, a neck-mounted smart glasses, a neck-mounted computer and an automatic magnetic connection device, which is characterized in that:

said palm keyboard consists of a left-handed keyboard and a right-handed keyboard, and both are held in the palm of the left hand and the right hand, respectively; the back of the keyboard is pressed against the palm via the connecting fixture; keys of said left-handed keyboard and the right-handed keyboard are arranged in rows and columns, the number of rows on each keyboard is not less than five rows, and the number of columns is not less than five columns; 26 English letters of said keys are arranged in three rows in accordance with QWERTY keyboard, arranged in the second, third and fourth rows of the five rows, and are consecutively arranged in sequence on the left-handed keyboard and the right-handed keyboard;

said neck-mounted smart glasses are capable of superimposing in the transparent realistic vision of the binocular glasses at least a rectangular video image of same or different viewing angle of binoculars with same back transparent or opaque variable sizes and positions as the PC computers and smart phones, the transparency and opacity of which is modulated by electrochromic lenses layer provided outside the optics for displaying the superimposed image;

the host of said neck-mounted computer and neck battery with neck cable can be used integrally or separately;

said automatic magnetic connection device communicatively and automatically attracts and connects the neck-mounted smart glasses and neck battery of the neck-mounted computer and/or the data transmission line of the host for conduction, the connection point of said magnetic connection device is set at the neck of the user;

wherein the row containing QWERTYUIOP in three rows of letters of said left-handed keyboard and right-handed keyboard keys is arranged in the palm of the user's hand in a position closer to the wrist, the user enables the fingertip portion of the finger to touch the keys to complete the operation of the mobile human-computer interaction command information input through finger stretching and bending, at the same time the command information will be output through wireless communication.

2. The neck-mounted wearable computer of claim 1 wherein said left-handed keyboard and right-handed keyboard both include a key panel with capacitive touch screen or resistive touch screen, a PCB electronic control board containing microprocessor, a keyboard battery, a keyboard casing, a connecting fixture that fixing the keyboard to the hand, a vibration motor that sends vibration signal feedback of key touch, and a buzzer that sends acoustic feedback signal of key touch; said connecting fixture is an elastic buckle or elastic band, said palm keyboard is also provided with a selection switch selecting one from three, namely vibration or buzzer or vibration-free mute; said key panel, vibration motor, buzzer and selection switch are each communicatively coupled to the microprocessor of PCB electronic control board.

3. The neck-mounted wearable computer of claim 2 wherein said palm keyboard is also provided with function switching key, which switches the keyboard input function of the key panel to sliding board mouse function or writing pad function; when the key panel is switched to one of the sliding board mouse function or the writing pad function, each of said left-handed keyboard and the right-handed keyboard will open a different one of two functions at the same time for use at the same time; said palm keyboard is also provided with a mode display lamp, which is communicatively coupled to the microprocessor of the PCB electronic control board; said mode display lamp includes a handwriting mode lamp, a keyboard mode lamp, and a mouse mode lamp; said PCB electronic control board is provided with a wireless connection module unit capable of inputting human-computer interaction and control commands to the host of the neck-mounted computer.

4. The neck-mounted wearable computer of claim 1 wherein an eyeglass neck cable for connecting the two glasses legs are provided between two glasses legs of the neck-mounted smart glasses; an upper transmission line is hidden inside the eyeglass neck cable, and the upper transmission line is introduced into the eyeglass neck cable from one side of the glasses leg in a single bundle or in two bundles from both glasses legs, leads out of the middle section of the eyeglass neck cable to connect to the automatic magnetic connection device; said neck-mounted computer is connected to the automatic magnetic connection device via lower transmission line; said automatic magnetic connection device comprises an upper magnetic connector and a lower magnetic connector, said upper magnetic connector is connected to the eyeglasses neck cable through the upper transmission line, and the lower transmission line hidden in the neck cable extends to the scruff of neck of the user to connect to the lower magnetic connector; said lower magnetic connector is provided with a guiding block, which enables the lower magnetic connector to always face upwards, and at the same time enables the upper magnetic connector to be automatically attracted and guided by the lower magnetic connector until they are correctly aligned and attracted to each other to conduct between the upper transmission line and the lower transmission line communicatively.

5. The neck-mounted wearable computer of claim 4 wherein said lower magnetic connector is provided with a fixing member to fix the lower magnetic connector to the collar or wearing apparel in a position at the scruff of user's neck, and said fixing member can be the elastic clip, buckle or magic tape.

6. The neck-mounted wearable computer of claim 5 wherein the battery outer surface of said neck-mounted computer is provided with a magnetic charging transmitting coil for wireless charging for the neck-mounted computer host or other devices and socket for charging or powering itself or/and other devices.

7. The neck-mounted wearable computer of claim 6 wherein said neck-mounted smart glasses is provided with a bone conduction microphone and piston air conduction headsets;

said bone conduction microphone only picks up the whispering sound information emitted by exhaled airflow rubbing the respiratory tract when the user is in a state of no vibration of the laryngeal vocal cords; said bone conduction microphone is fixed in the nose pads of the smart glasses body, and the legs of smart glasses body are equipped with a microprocessor electronic control unit with video image display drive, and said bone conduction microphone collects amplitude-modulation audio electric signals generated by the sound vibration of nasal bones, which is then communicatively coupled to the microprocessor electronic control unit;

said air-conduction headsets are set at the position near the user's ear and behind two legs of the glasses body, suspended in an in-ear position facing the vortex of the user's ear, said air conduction headsets are provided with a microphone touch-sensitive two-option conversion switch, and the shank of said air conduction headsets are movably connected to the smart eyeglasses body.

8. A method of using a neck-mounted wearable computer, which is characterized in that:

Step 1 wearing method:

Hanging the neck-mounted computer around the neck first, and then erecting the neck-mounted smart glasses on the ears and the nose bridge from the head down to complete all the wearing; said automatic magnetic connection device automatically attracts and connects the smart glasses and battery between neck-mounted smart glasses and the neck-mounted computer and/or the data transmission line of the computer host for conduction;

Step 2 operation method:

The palm keyboard and the neck-mounted smart glasses are used in combination to realize that the user implements human-computer interaction with the neck-mounted computer in the posture of standing, walking, sitting and lying, and the specific operation methods are as follows:

when carrying out human-computer interaction in walking, the finger touches the palm keyboard keys to type, or the finger touches the function switching key to switch to the mouse interface to manipulate the sliding board mouse, or switch to the writing pad interface to write character command information in a touch-type writing manner to input to the neck-mounted computer host;

before the user uses traditional QWERTY keyboard for touch typing or uses the writing pad for touch writing, the user also needs to use the sliding board mouse accordingly narrow the display screen in neck-mounted smart glasses and drag it to the bottom of the glasses visual field according to the walking speed;

when in the noise environment or private calls or voice instructions is needed, gently press the piston air conduction headsets into the ear to isolate the external noise, and at the same time gently touch the two-option conversion switch on the headsets to close the air conduction headsets and switch to bone conduction microphone, human-machine interaction input into the computer host is achieved through bone conduction language command information by whisper made from exhaled airflow rubbing the respiratory tract when the user is in a state of no vibration of the laryngeal vocal cords;

said neck-mounted computer host receives the input command information and then uploads the audio and video information of the calculation result into the neck-mounted smart glasses, outputs the video and audio display of human-computer interaction for the user, and completes the human-computer interaction;

said neck-mounted smart glasses provide the user with human-computer interaction outputs of various audio and video display methods, including providing VR virtual reality display and widescreen movie display of superimposed virtual video image and the entire visual field of the glasses around it with opaque back, at which time the entire visual field of the glasses is covered by an opaque electrochromic lens layer; it also provides with AR augmented reality display of superimposing virtual video image brighter than the superimposed object in the transparent realistic field of glasses to enhance cognitive information, at which time the entire visual field of glasses is covered by a fully transparent electrochromic lenses layer; it includes provides with superimposed images that is brighter, darker, or alternately bright and dark than the superimposed object, in or out of the visual field of the glasses, shot of real things, or that the glasses wearer would like to know on the realistic field of the transparent realistic field of eyeglasses, such as display of any audio and video information of a rectangular screen of existing PC computer and smart phone that is opaque on the back, at which time the rectangular screen portion superimposed in the transparent realistic field of the eyeglasses is covered by a modulated opaque electrochromic lenses layer; it includes providing with various video displays of outdoor giant screen, indoor wall-mounted TV, laptop computers, tablet computers, or the audio and video display of lower horizontal bar of information needed for running, biking and driving by changing the size of the PC computer screen display in the realistic field of the eyeglasses; when said neck-mounted smart glasses superimpose rectangular video image of same or different viewing angles of the binoculars in the realistic field of the binocular glasses, said video image is an image displayed in 2D or 3D;

Step 3 a method of collectively using today's smartphone with multiple operating systems and PC computer with multiple operating systems through mobile cloud computer terminals:

the host of said neck-mounted computer is selected from any smartphone with closed or open operating system in prior art, and a smartphone may be collectively select, download and install a plurality of cloud cell phone APPs with different operating systems and a plurality of cloud computer APPs with different operating systems; and the user can use all the world's application software ecological resources directly on the cloud;

wherein when collectively using the mobile cloud computer terminal, said smartphone sends finger touch palm keyboard key input information, touch sliding board mouse input information, writing pad writing input information, ordinary voice or whispered voice input information to cloud computer through 5G or wireless communication with higher peak transmission rate to compute and wirelessly receive video image information of the computation results, and casts it to the screen of the neck-mounted smart glasses to output display.

* * * * *